(12) United States Patent
Hopkins

(10) Patent No.: US 7,962,923 B2
(45) Date of Patent: Jun. 14, 2011

(54) SYSTEM AND METHOD FOR GENERATING A LOCK-FREE DUAL QUEUE

(75) Inventor: William E. Hopkins, Brighton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 1051 days.

(21) Appl. No.: 11/323,442

(22) Filed: Dec. 30, 2005

(65) Prior Publication Data
US 2007/0157200 A1    Jul. 5, 2007

(51) Int. Cl.
G06F 3/00 (2006.01)
G06F 9/44 (2006.01)
G06F 9/46 (2006.01)
G06F 13/00 (2006.01)

(52) U.S. Cl. ........................................... 719/320

(58) Field of Classification Search .................. 719/314, 719/320; 718/100
See application file for complete search history.

(56) References Cited

U.S. PATENT DOCUMENTS

| | | | | |
|---|---|---|---|---|
| 5,706,515 | A * | 1/1998 | Connelly et al. | 718/106 |
| 6,651,146 | B1 * | 11/2003 | Srinivas et al. | 711/150 |
| 6,826,757 | B2 * | 11/2004 | Steele et al. | 719/314 |
| 7,117,502 | B1 * | 10/2006 | Harris | 719/315 |
| 7,293,143 | B1 * | 11/2007 | Shavit et al. | 711/147 |
| 2007/0169123 | A1 | 7/2007 | Hopkins | |

OTHER PUBLICATIONS

Nick Parlante, "Linked List Basics", 2001, Stanford CS Education Library, pp. 1-25.*

Maurice P. Herlihy, "A Methodology for Implementing Highly Concurrent Data Objects," ACM Transactions on Programming Languages and Systems, Oct. 2, 1991.

Maged M. Michael, "High Performance Dynamic Lock-Free Hash-Tables and List-Based Sets," Poc. 14th Annual ACM Symp. Parallel Algorithms and Architectures, Aug. 2002.

Maged M. Michael, "Hazard Pointers: Safe Memory Reclamation for Lock-Free Objects," IEEE Transactions on Parallel and Distributed Systems, vol. 15, No. 6, pp. 491-504, Jun. 2004.

Maged M. Michael, "Scalable Lock-Free Dynamic Memory Allocation," The 2004 ACM SIGPLAN Conference on Programming Language Design and Implementation, Jun. 2004.

(Continued)

Primary Examiner — Andy Ho
Assistant Examiner — Timothy A Mudrick

(57) ABSTRACT

A method of supporting condition synchronization for a shared data structure so as to provide concurrent access. A protocol is provided between a thread creating a request as part of a remove operation and a thread fulfilling a request as part of an add operation. The protocol provides for the thread making such a request to check the request_value field of the request node and then wait on its own condition variable. A requesting thread sets a requestor_id field of a request node with a value that identifies the thread. A fulfilling thread sets a request_value field of a request node with the address of the data node with the value, and then signals the requesting thread as identified by the requestor_id field. Upon receiving the signal, the requesting thread wakes up and retrieves the value from the data node pointed to it by the request_value field of the request node. If a wait times out, the requesting thread attempts to signal that the wait timed out by performing a CAS operation on the request_value field to modify it from zero to non-zero. If the CAS operation succeeds, the request timed out and the remove operation return failure. If the CAS operation fails, the request was fulfilled since the fulfilling thread set the request_value field with the address of the data node.

17 Claims, 15 Drawing Sheets

OTHER PUBLICATIONS

Maged M. Michael and Michael L. Scott, "Simple, Fast, and Practical Non-blocking and Blocking Concurrent Queue Algorithms," Proc. 15th Annual ACM Symp. Principles of Distributed Computing, May 1996.

William N. Scherer III and Michael L. Scott, "Nonblocking Concurrent Data Structures with Condition Synchronization," 18th Annual Conf. on Distributed Computing, Oct. 2004.

Maged M. Michael, "CAS-Based Lock-Free Algorithm for Shared Deques," Proc. Ninth Euro-Par Conf. Parallel Processing, Aug. 2003.

* cited by examiner

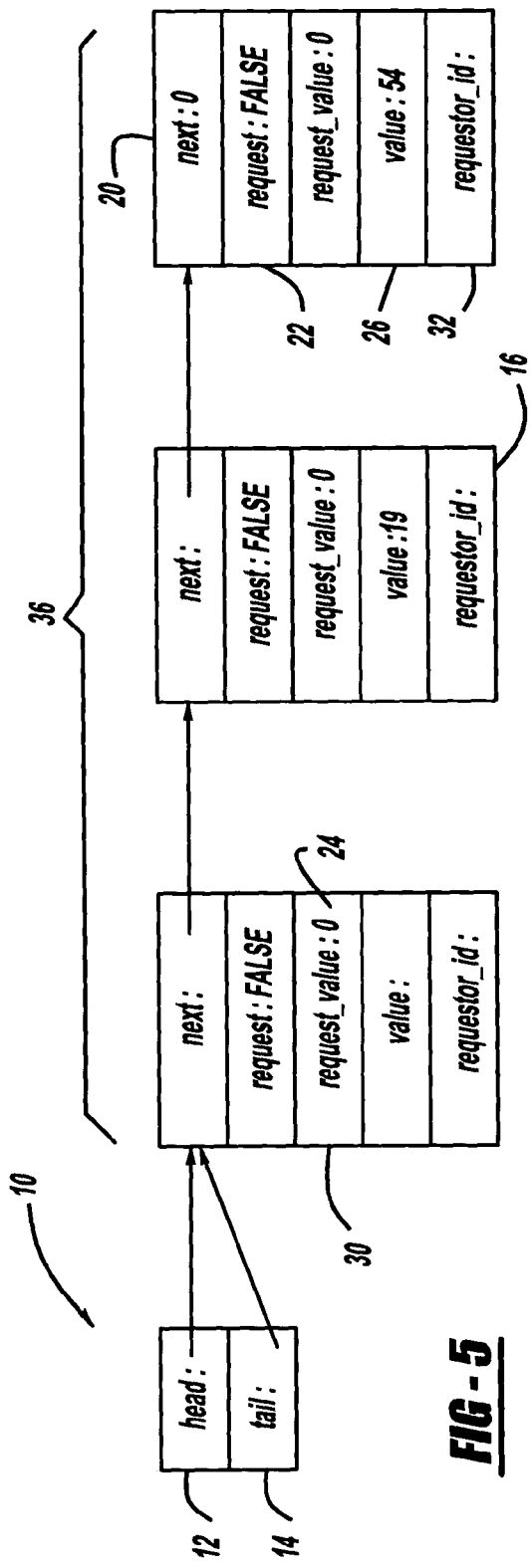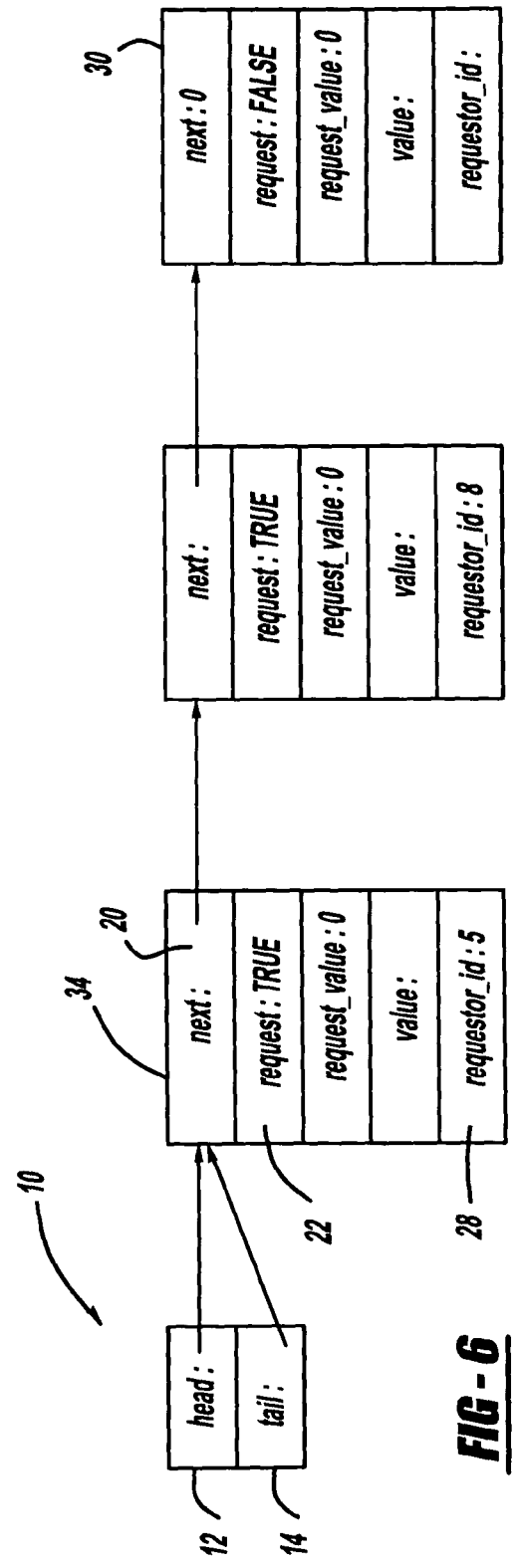

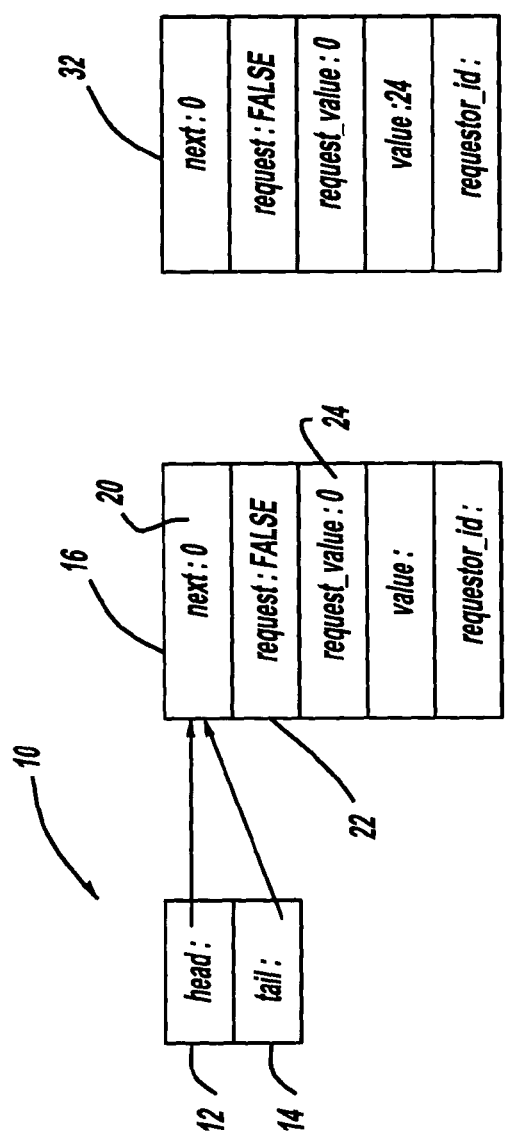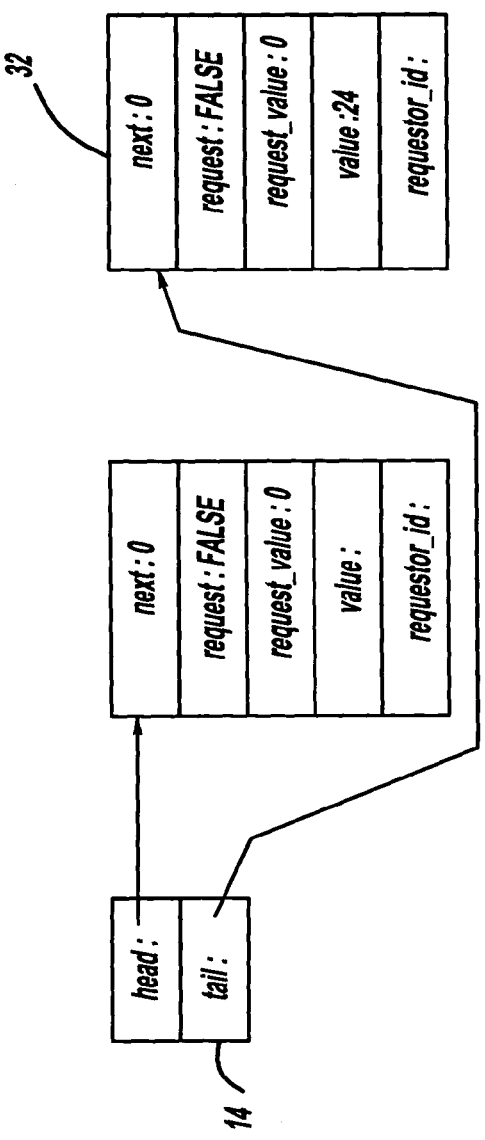

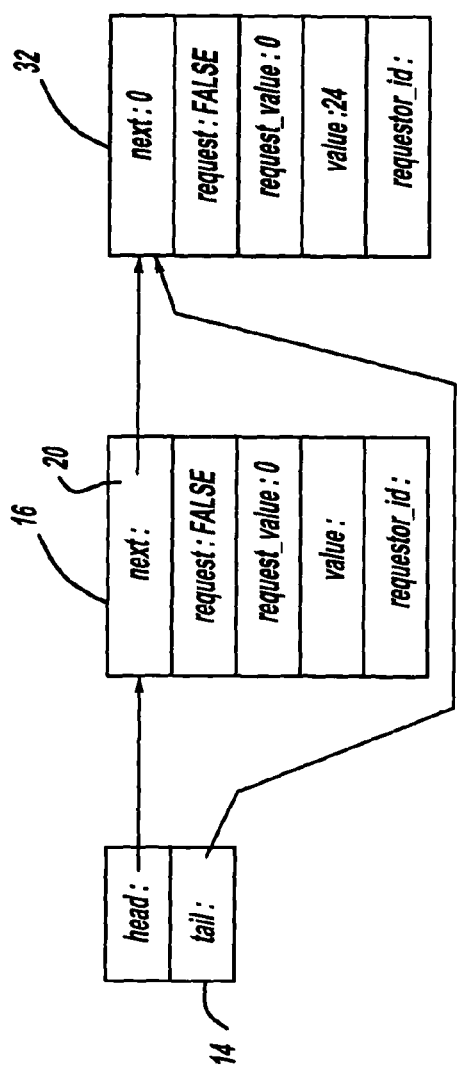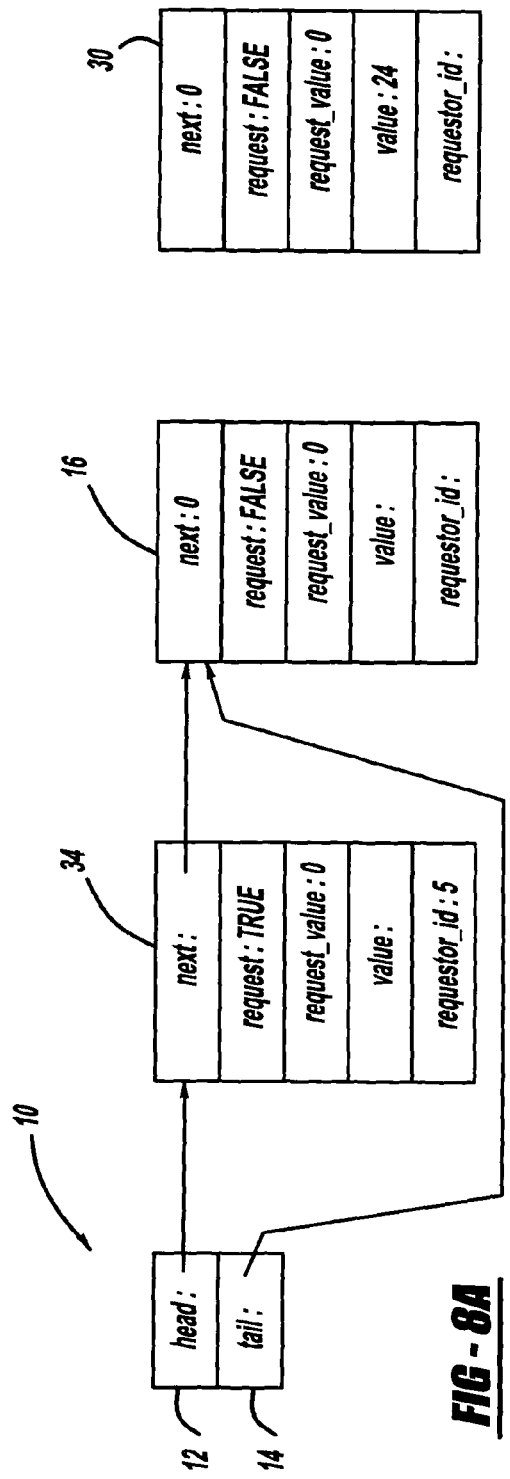

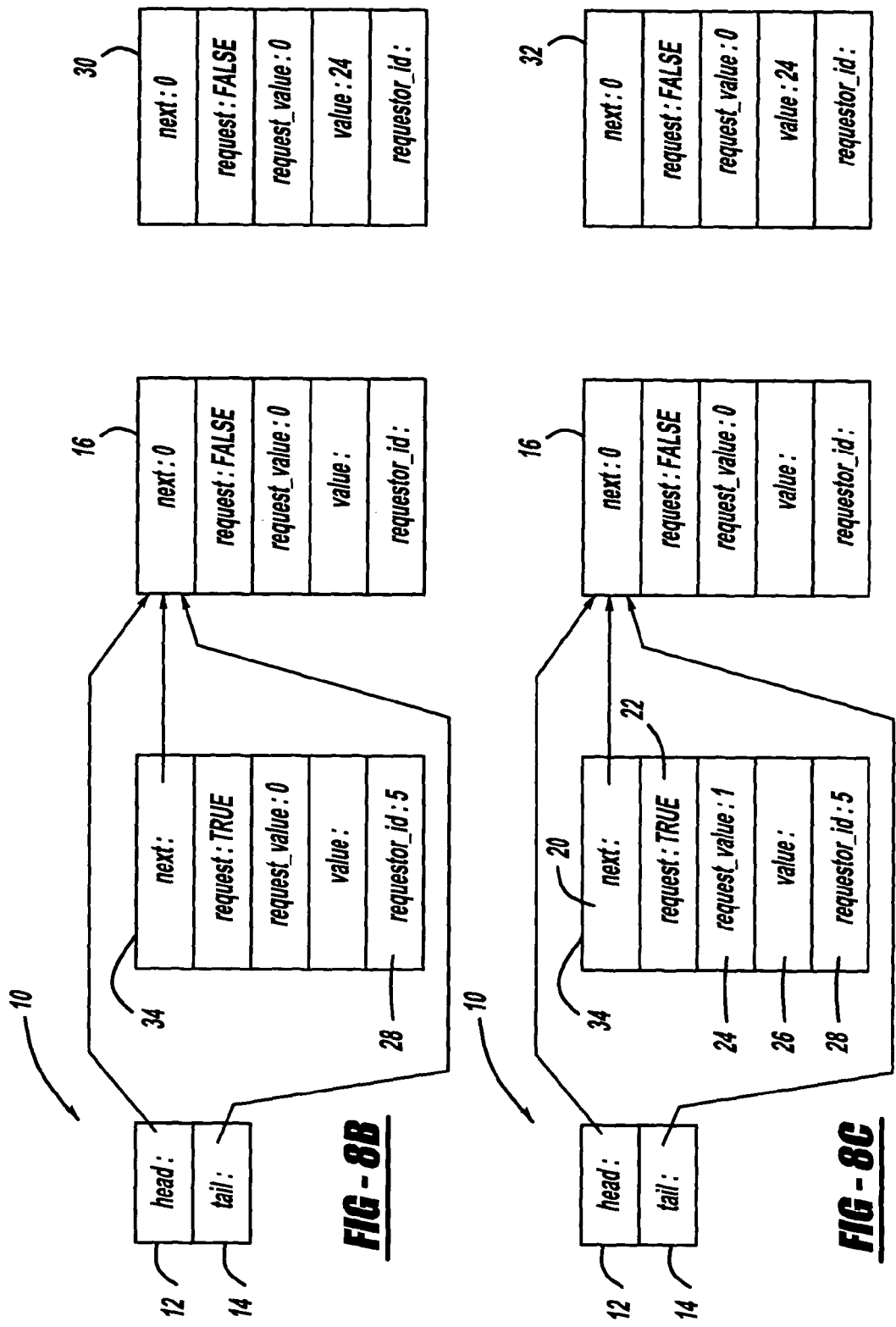

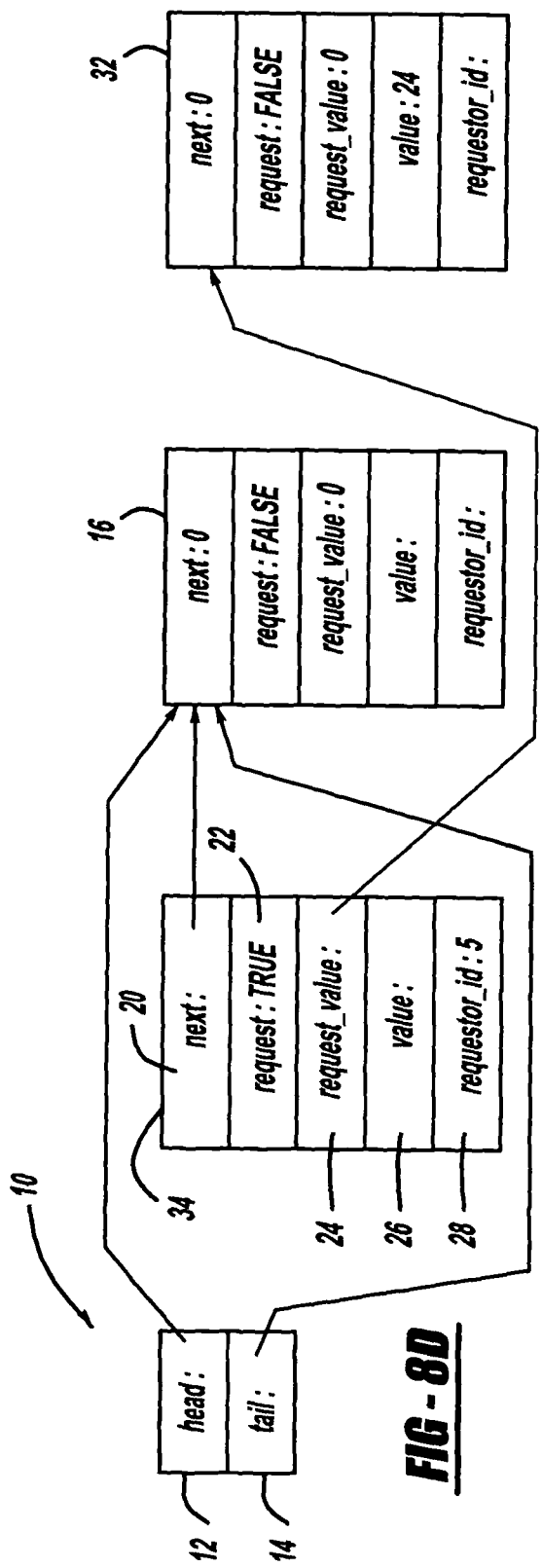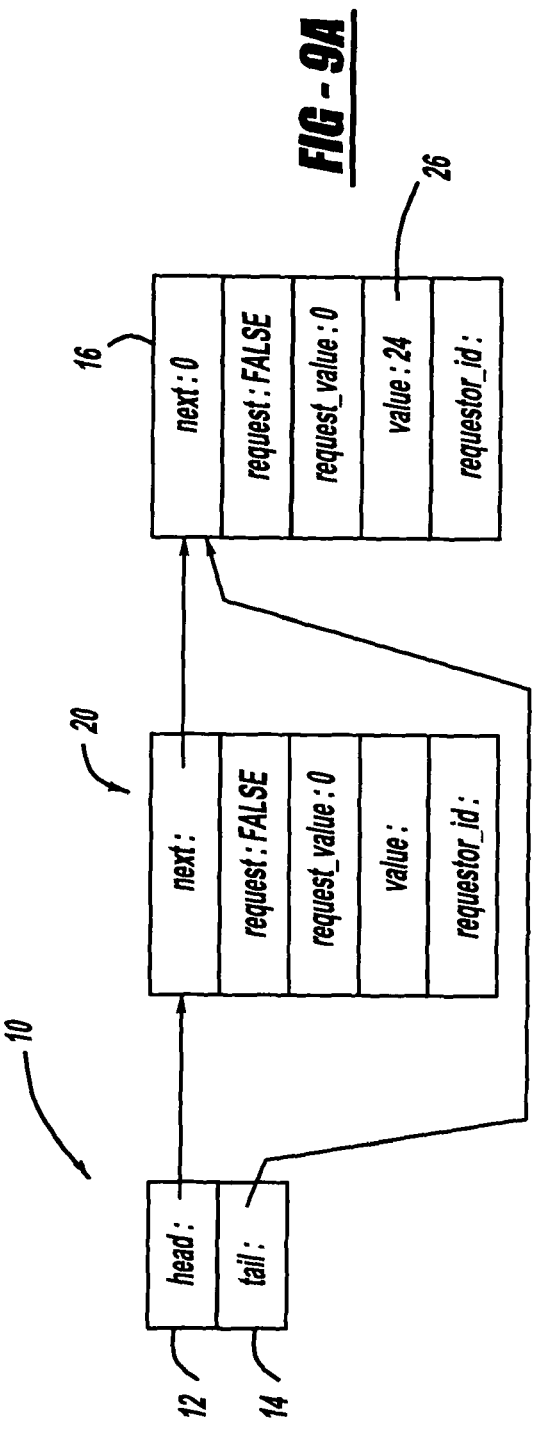

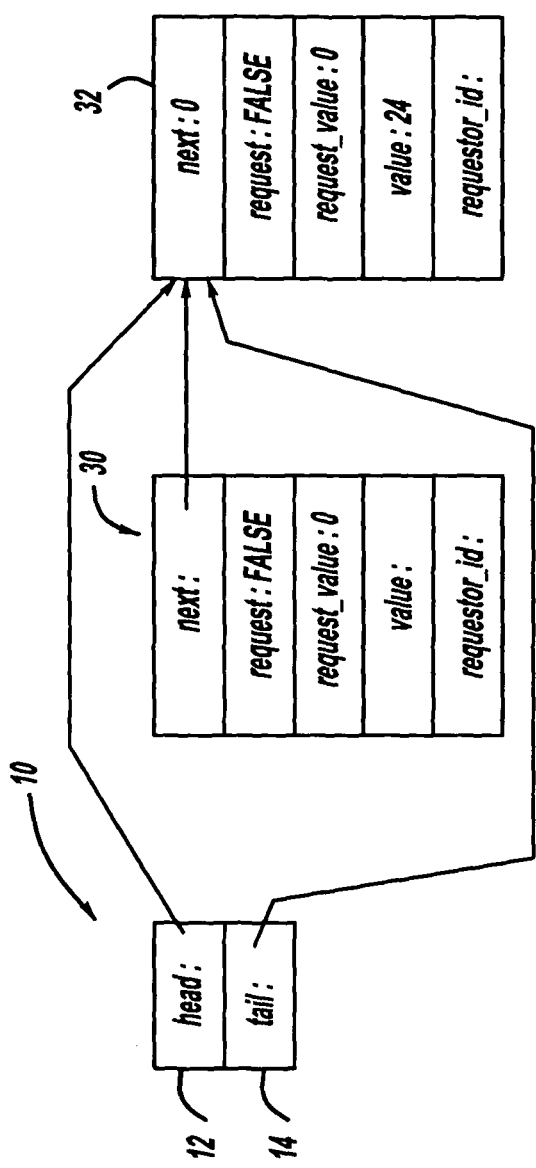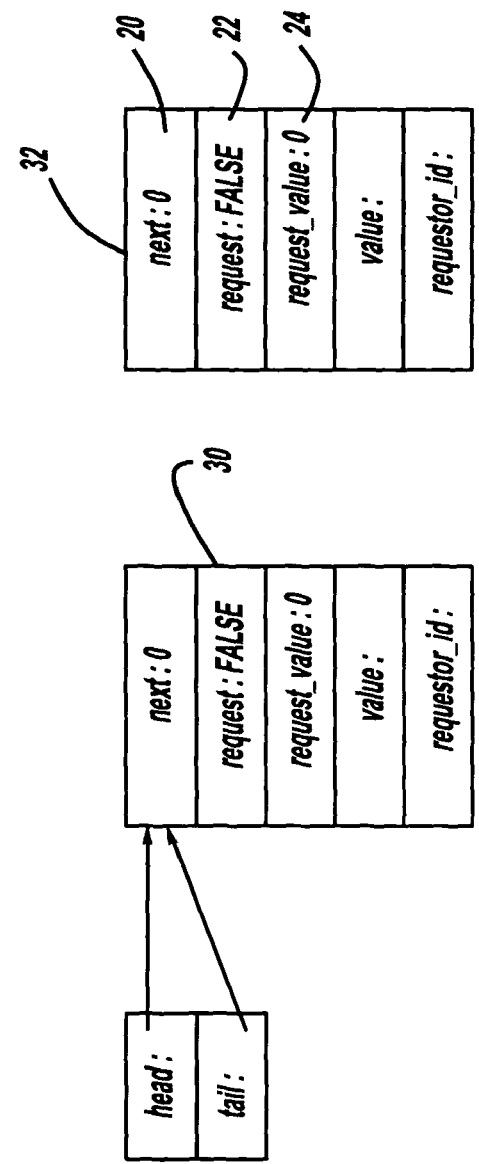

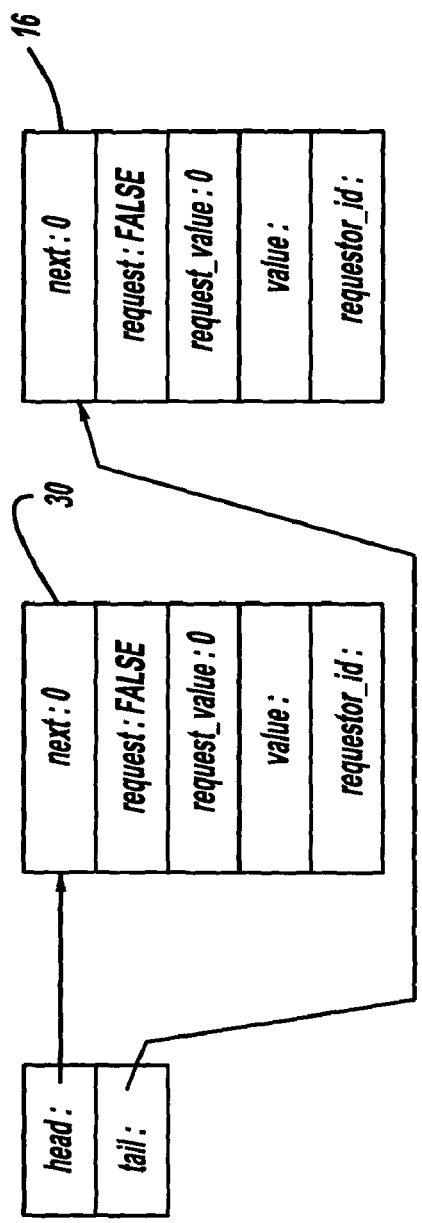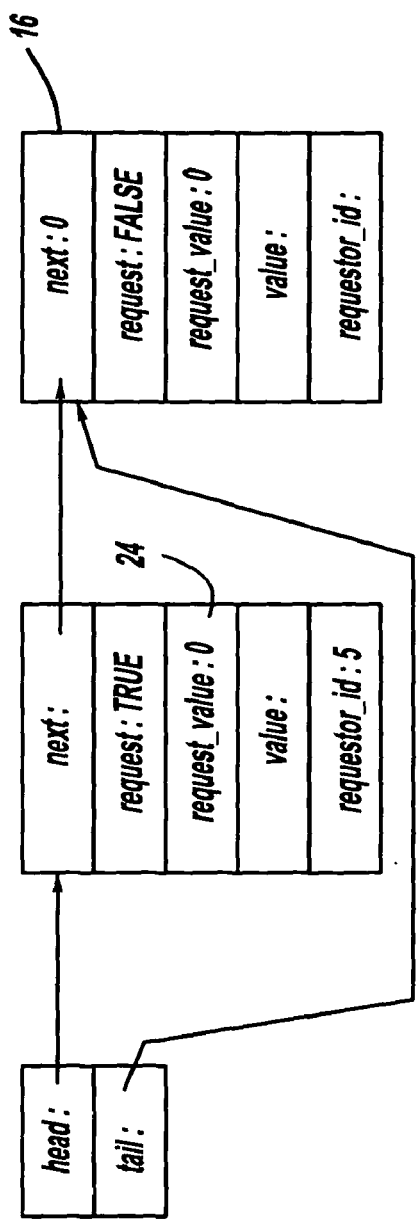

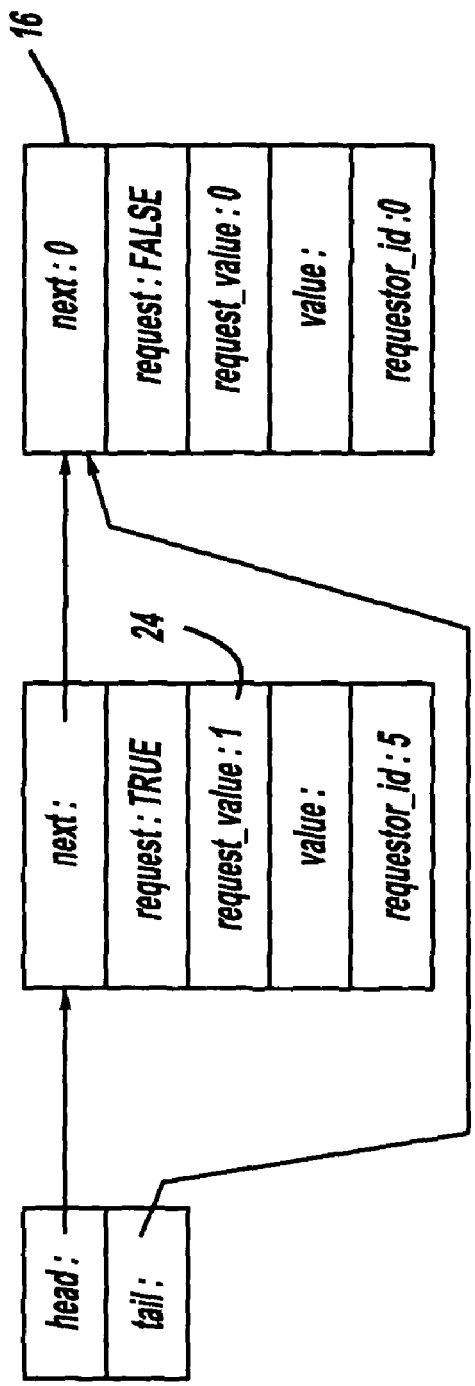

SYSTEM AND METHOD FOR GENERATING A LOCK-FREE DUAL QUEUE

TECHNICAL FIELD

This invention relates generally to multithreaded application programs, and more particularly, to a method of supporting condition synchronization for shared data structures so as to provide concurrent access.

BACKGROUND ART

In computer science, a data structure is a way of storing data in memory so that it can be accessed and used efficiently. There are different kinds of data structures each suited to different kinds of applications and/or specialized tasks. In fact, a carefully chosen data structure will allow more efficient algorithms to be used.

Queues are data structures to which data elements are added and removed, with the property that the elements are removed in the order that they are added (known as "first-in, first out" or FIFO). Basic operations are add to the "tail" (the last item of a list), or enqueue and remove from the "head" (the first item of a list) or dequeue. In software design, Queues often function to decouple one or more producers of data elements from one or more consumers of the data elements. The producers and consumers are frequently different threads of execution within the same process. The single queue tying together a set of producers and consumers is maintained in memory shared by all (easily achieved by threads executing in a single process address space) and is acted upon directly by each of the different threads representing the producers and consumers.

Threads of execution ("threads") are a way for a program to split itself into a plurality of (two or more) simultaneously running sequential tasks. Multiple threads can be executed in parallel on many computer systems. Such "multithreading" occurs by time slicing wherein a single processor switches between different threads or by multiprocessing wherein threads are executed on separate processors. Many operating systems directly support both time-sliced and multiprocessor threading with a process scheduler. The operating system kernel allows programmers to manipulate threads via the system call interface. Some implementations are called kernel threads or "lightweight" processes.

In the context of software execution, a thread is a sequence of machine instruction execution as specified by written software. It has local state in the form of registers and stack memory. Stack memory is needed to maintain values when there is more state to be kept than there are registers to keep it. Also, because of synchronous subroutine calls ("function calls"), the stack also keeps the current function state while it waits for a function it invoked to return.

Significantly, instructions are executed sequentially within a single thread. Changes to the state of memory occur one instruction at a time. Problem solving via software has been an exercise of determining how to go from some initial state to some final state via a sequence of small state changes. This simplifies reasoning about program execution since one need only consider the current state and how the next instruction modifies it.

Processes always have at least one thread. Before the advent of the notion of having multiple threads in a single process, there was no need to refer to the sequence of instruction execution separately from a process; there was a one-to-one relationship between the two. Threads also differ from processes in the way that they share resources. Specifically, threads are distinguished from traditional multi-tasking operating system processes in that such processes are typically independent, carry substantial state information, have separate address spaces, and interact only through system-provided inter-process communication mechanisms. Multiple threads, in contrast, typically share the state information of a single process, and share memory and other resources directly.

"State" can mean different things depending on the context and the level of abstraction. At the threshold, there is "state" of memory, which is simply the actual content at some particular moment in execution. Most frequently, however, programmers are interested in a small subset of memory whose content is relevant for a particular situation. For example, the "precondition" for executing a function is a requirement on the state at the point of function invocation in terms of the value of meaningful objects defined in memory at the time. "State" may also be defined at a higher level of abstraction in the sense of a finite state machine as discussed in further detail below.

Processes "own" resources allocated by the operating system including, for example, memory threads, file handles, sockets, device handles, and windows. Significantly, processes do not share address spaces or file resources except through explicit methods such as shared memory segments. If multiple threads can exist within a process, then they share the same memory and file resources. Threads are preemptively multi-tasked if the operating system's process scheduler is preemptive. However, threads do not own any resources with the exception of a stack, thread-specific data, and a copy of the registers including the program counter.

An operating system creates a process for the purpose of running an application program. Every process has at least one thread with most operating systems allowing processes to have multiple threads. Multiple threads allow a process to perform multiple functions concurrently. Since the threads generated by a program share the same address space, one thread can access and modify data that is used by another thread. This can be problematic. On the one hand, such shared access promotes easy communication between and among threads. On the other hand, programming errors can result in one thread inadvertently overwriting data being used by another thread.

As indicated above, threads act upon a queue by invoking the two defined operations, add and remove, which add an element to the "tail" and remove an element from the "head" of the queue, respectively. The implementations of the operations expect the queue to be in a particular state when invoked and leave the queue in a particular state when the operation is completed. During execution, the operations read the state of the queue from memory, modify the value representing the state, and then write the new value back to the memory representing the queue.

With multiple threads operating on a single queue at the same time, there can be multiple operations executing simultaneously. This will generally lead to errors in modifying the queue state because one thread will read the state and begin modifying it while another thread changes the queue state to something incompatible with what the first thread is going to write back. This occurs because it is generally assumed in the implementation of operations that nothing else is modifying the queue while the operation is executing, i.e. operations execute atomically.

In concurrent programming (programs that use language constructs for concurrency, including multi-threading), atomicity is equivalent to linearizability with the additional property that none of its effects are visible until after it completes.

In atomicity, there are no intermediate steps visible to other threads. In operating systems, an "atomic" operation is one that is not (or cannot be) interrupted once it has started. Thus, basic instructions such as add or store are usually guaranteed by the hardware to be atomic. Some platforms also provide a pair of operations (load-link/store-conditional) that only have an effect if they occur atomically. Such a property is used to implement "locks" in multithreaded programming as discussed below. Accordingly, atomicity is used to prevent read-write and write-write conflicts.

To avoid the above queue modification errors, threads "take turns" executing operations on a shared queue, i.e., access from multiple threads is serialized. This discipline of access is enforced in the operations by using mutual exclusion locks ("mutexes") that block all threads but one from executing an operation. When one thread is done executing an operation, the next thread waiting is then allowed to execute.

Mutual exclusion locks are used in concurrent programming to avoid the concurrent use of shared resources. A "critical section" is a span of code that, because it manipulates shared resources such as memory, can be executed by only one thread at a time. That span is defined as that between the lock and the unlock of a mutex (other synchronization primitives such as semaphores, can also be used). Critical sections are necessary because a thread can be switched at any time thereby offering another thread the opportunity to change shared data of the first thread. As readily seen, such switching may lead to inconsistent data.

In summary, with the exception of the additional overhead incurred from mutex implementation, serial access to queues is not much of a problem in single processor systems from a resource allocation standpoint. However, when the process is executing on a multiprocessor system, such serialization of operation execution reduces the gain in throughput that would have otherwise occurred by having the threads executing on the multiple processors simultaneously.

To achieve simultaneous execution of queue operations, they must not require serialization. This can happen by, instead of simply requiring a consistent state between complete operations, requiring a consistent state between each atomic machine instruction. This requirement can be somewhat relaxed to requiring a consistent state between each atomic modification to the shared queue state within operation execution.

Algorithms that permit multiple simultaneous executions on a shared object, such as a queue, are known as "lock free" (generally because they avoid the use of mutex locks, as discussed above). In computer science, an algorithm is understood as a set of defined instructions for accomplishing a task which, given an initial state, will terminate (produce an answer after running for a finite number of steps) in a corresponding recognizable end-state. Algorithms are, of course, essential to how computers process information since, in essence, an algorithm simply tells the computer what steps to perform (and in what order) to carry out a specified task. Thus, an algorithm is considered to be any sequence of operations which can be performed by a Turing-complete system (i.e. a programming language or any other logical system that has computational power equivalent to a universal Turing machine.).

In contrast to algorithms that protect access to shared data with locks, "lock-free" algorithms are specially designed to allow multiple threads to read and write shared data concurrently without corrupting it. An algorithm is said to be "wait-free" if every thread will continue to make progress in the face of arbitrary delay (or even failure) of other threads. Thus, a "wait-free" algorithm can complete any operation in a finite number of its own steps, regardless of the actions, timing, interleaving, or speed of other threads. By contrast, a "lock-free" algorithm requires only that some thread always make progress. "Lock-free" thus refers to the fact that a thread cannot lock up, i.e. every step it takes brings progress to the system. This means that no synchronization primitives such as mutexes or semaphores can be involved, as a lock-holding thread can prevent global progress if it is switched out. As readily seen, a lock-free algorithm is not necessarily wait-free.

By necessity, lock-free manipulation of shared object state still requires a read-modify-write sequence. That is, read the object state in shared memory into local memory (registers ultimately), modify the values according to changes being made, and then write the values back to the shared object memory. To avoid the potential inconsistency by having multiple threads making changes at the same time, the changes are written back only if the shared state hasn't changed since it was read by the thread attempting to make the change. This check of whether the state has changed, however, necessarily requires a read instruction, compare instruction, branch instruction, and write instruction. Accordingly, they raise the same problem referenced above, i.e., another thread can write the shared memory after it was read and before it was written.

In response to this problem, hardware designers have included special instructions known as conditional synchronization primitives that atomically perform the read-compare-branch-write as a single hardware instruction. There are two common types of these instructions: compare-and-swap (CAS) and load-linked/store-conditional (LL/SC). The CAS instruction atomically compares the contents of a memory location to a given value and, if they are the same, modifies the contents of that memory location to a given new value. More specifically, the CAS instruction takes three arguments: a memory address, the expected value, and the new value; sets the memory address to the new value if the memory has the expected value; and returns a Boolean value, depending on whether the value at the address was changed. The CAS instruction is used to implement higher level synchronization mechanisms, such as semaphores and mutexes, in addition to being used to implement lock-free algorithms.

The load-linked/store conditional (LL/SC) is a pair of instructions. Load-link loads a value into a register from memory. A subsequent store-conditional instruction assigns to that memory a new value if the memory hasn't changed since the load-link and returns a Boolean value depending on whether assignment took place.

Conditional synchronization primitives are limited to acting on a single word of memory. Therefore, lock-free algorithms must be designed such that critical transitions, i.e. from one consistent state to another, can be affected by the modification of shared state contained within that single word of memory.

Given how conditional synchronization primitives operate, the general approach in lock-free algorithms is to: (1) read shared state into local memory (typically registers); (2) modify values in local memory to effect the desired operation; and (3) attempt to write back the changed values to the shared memory using the CAS instruction. If the CAS instruction fails, i.e. some other thread modified the shared state between the read and the CAS, the operation loops back to try again, starting with reading in the updated values of the shared state.

There are general approaches to transforming a standard sequential object (i.e. data structure and associated algorithms) implementation to a lock-free design. See, for example, Maurice P. Herlihy, "A Methodology for Implementing Highly Concurrent Data Objects", *ACM Transactions on Programming Languages and Systems,* 15(5):745-770, November 1993. These approaches, however, have generally exhibited poor performance—even as compared to designs using standard locking mechanisms. Accordingly, current design objectives now focus on finding and implementing lock-free algorithms specific to particular objects. See, for example, Maged M. Michael, "High Performance Dynamic Lock-Free Hash Tables and List-Based Sets", *Proc. 14th Annual ACM SYMP. Parallel Algorithms and Architectures,* pp 73-82, August 2002; Maged M. Michael, 'CAS-Based Lock-Free Algorithm for Shared Deques", *Proc. Ninth Euro-Par Conf. Parallel Processing,* pp. 651-660, August 2003; Maged M. Michael and Michael L. Scott, "Simple, Fast and Practical Non-blocking and Blocking Concurrent Queue Algorithms," *Proc. 15th Annual ACM Symp. Principles of Distributed Computing,* pp. 267-275, May 1996; and William N. Scherer III and Michael L. Scott, "Nonblocking Concurrent Data Structures with Condition Synchronization", *18th Annual Conf. on Distributed Computing,* October 2004. As readily seen, this is a fairly ad-hoc process.

Other issues also arise in the design of lock-free algorithms that must be addressed. One is known in the art as the ABA problem which arises when a CAS instruction can't make the distinction between the memory location having never been changed and being changed but then being changed back to the expected value before the CAS instruction is executed. Assumptions associated with the expected value can change. A common solution to the ABA problem is to append a counter to the value in memory being updated. See, IBM System/370 *Extended Architecture, Principles of Operation,* 1983, Publication No. SA22-7085. The counter is incremented each update, so even if the same value is assigned to the location, the update counter will be different.

Another problem associated with lock-free designs is memory reclamation. Given that multiple threads can be executing operations simultaneously, even though one thread has determined that a shared object is no longer needed, it is sometimes difficult to be certain that no other thread is attempting to access that shared object. Returning the object to the memory allocator could result in runtime errors if other threads are attempting to access the object. Solutions have been identified, but at the cost of higher complexity. See, Maged M. Michael, "Hazard Pointers: Safe Memory Reclamation of Lock-Free Objects", *IEEE Transactions on Parallel and Distributed Systems,* Vol. 15, No. 6, pp. 491-504, June 2004.

One other problem associated with lock-free implementations is the impact of compiler optimization when writing in higher level languages, e.g. C++. For reference, C++ (pronounced "C plus plus") is a general purpose computer programming language. It is a statically typed multi-paradigm language supporting procedural programming, data abstraction, object oriented programming, and generic programming, and is currently one of the most popular commercial programming languages. The optimization issue is that compilers assume serial execution. Therefore, they attempt to limit memory access by caching values in registers rather than loading from memory at each access when there is no evidence in the code of the memory location being changed. This is a reasonable assumption for strictly sequential access. However, when it is possible for multiple threads to be changing shared memory simultaneously, it is important that each read of shared memory loads the value from memory. To avoid this optimization, C++ provides the volatile type modifier, which disables this particular optimization and forces a load from memory each access. The object in shared memory could be an instance of a type that is accessed via member functions. In such case, member functions can be declared volatile, thus ensuring that the member function implementations will load from memory at each access.

One of the earliest efforts in lock-free algorithms was in the early 1980's when the CAS instruction was included in the above referenced IBM System/370 processor architecture. The starting point for this work was a lock-free queue that was simple, truly non-blocking, and depended on only the CAS instruction commonly available on most hardware. This queue provided excellent performance on even a single processor, along with linear speedup (i.e. scalability) on shared memory multiprocessors. However, the queue had no means of blocking a thread making a request on an empty queue and to wait until a data element is added. This is an important property in most real-world applications and is generally implemented using condition variables along with mutexes.

More recently, efforts have been made to overcome the lack of condition synchronization in the above queue design. See, for example, the lock-free dual queue (S+S queue) disclosed in the above referenced paper William N. Scherer III and Michael L. Scott, "Nonblocking Concurrent Data Structures with Condition Synchronization", *18th Annual Conf. on Distributed Computing,* October 2004. As disclosed, this queue supports having threads wait when performing a remove operation on an empty queue. The waiting thread will then continue once a data element is added to the queue. An important aspect of this design is that it is a "dual" queue. That is, it will queue requesting threads when there are no data elements so that when data elements are added, the request will be filled in the order in which they are made. Thus, the first-in-first-out protocol is maintained for both the requesting threads and the data elements.

The S+S queue, however, had two major defects that made it unusable for most practical systems. First, the ability to have threads wait for a data element to be added was implemented by a busy wait, i.e. a loop that continuously checks to see if a value has changed. Busy waits are acceptable only when the delays are minimal (such as adaptive mutexes that use spin locks). If, however, the wait goes into the range of tens of milliseconds, it not only uses up resources that could be more productively used otherwise, but it also warps scheduling algorithms. Second, the S+S queue precluded any time limit from being defined on how long a thread should wait. This is important in practical systems so that a thread can fail waiting for a data element after some specified amount of time, thus, for example, allowing for recovery from late or missing events elsewhere in the system. One other issue is that the S+S design utilized such a complex algorithm that it was difficult to create an implementation that didn't have race conditions, especially in the area of memory reuse.

In summary, current software uses mutex locks that enforce the unique access of queue critical sections. Such a mutex-based approach greatly diminishes parallel efficiency on multi-processor systems. And the current best published lock-free dual queue suffers from at least two major shortcomings, namely: (1) a busy-wait implementation that consumes excessive CPU cycles; and (2) the inability to terminate the wait for a data element after a specified time-out interval.

Consequently, a need exists for an improved lock-free dual queue that overcomes the above problems.

DISCLOSURE OF INVENTION

It is a principle object of the present invention to make software more scalable by eliminating contention and overhead costs associated with mutex-lock based queues.

It is a further object of the present invention to provide a method of supporting condition synchronization for a shared data structure so as to provide concurrent access.

Still further, it is an object of the present invention to provide such synchronization of access through the use of condition synchronization primitives on shared values.

Yet still further, it is an object of the present invention to provide such synchronization of access wherein a thread waiting for an item to be added to a data structure ("queue") waits on a condition variable unique to the waiting thread which is signaled by the thread that adds the value to the queue.

Further, it is an object of the present invention to provide such a method and data structure wherein manipulation of the structure itself is entirely lock-free, thus eliminating contention cost or exclusive access causing threads to block.

In carrying out these and other objects, features and advantages of the present invention, there is provided a method of supporting condition synchronization for a shared data structure so as to provide lock-free simultaneous access. The method is generally directed for use in multithreaded applications running on multiprocessor systems that utilize queues to coordinate or share objects between threads. The method is thus specifically applicable to software running on shared memory multiprocessor systems, especially in core applications such as operating systems, routers, etc. The method comprises providing a linked list of nodes representing the data structure and having corresponding addresses, including a head pointer pointing to a first node and a tail pointer pointing to a last node in a list, and all nodes therebetween pointing to the next successive node. The data structure has add and remove operations defined on it the effect of which depend on the state of the structure. The method further comprises providing a protocol between a thread creating a request as part of a remove operation and a thread fulfilling a request as part of an add operation. The protocol provides for the thread making such a request to check the request_value field of the request node and then wait on its own condition variable. More specifically, a requesting thread sets a requestor_id field of a node with a value that identifies the requesting thread. A fulfilling thread sets a request_value field of a request node with the address of the data node with the value, and then, using the requestor_id field value, signals the requesting thread that the reqeust_value field has been set. Upon receiving the signal, the requesting thread wakes up and retrieves the value from the data node pointed to it by the request_value field of the request node, and the fulfilling thread removes the request node from the head of the linked list. If a wait-for-signal call returns with an indication that a specified timeout interval has elapsed, the requesting thread sets the request_value field of the request node to a non-zero value via a CAS operation. If the CAS operation is successful, the remove operation returns that the operation timed out. If the CAS operation fails, the request was fulfilled since the fulfilling thread set the request_value field with the address of the data node.

The above objects, features and advantages of the invention are readily apparent from the following detailed description of the best modes for carrying out the invention when taken in conjunction with the accompanying drawings wherein like reference numerals correspond to like components.

BRIEF DESCRIPTION OF DRAWINGS

FIG. 5 is a schematic diagram of the queue of FIG. 2 with data nodes;

FIG. 6 is a schematic diagram of the queue of FIG. 2 with request nodes;

FIGS. 7A-7C are schematic diagrams illustrating the steps of adding to the queue of FIG. 2 which is empty or contains data nodes, in accordance with the present invention;

FIGS. 8A-8D are schematic diagrams illustrating the steps of adding to the queue of FIG. 2 containing request nodes, in accordance with the present invention;

FIGS. 9A-9B are schematic diagrams illustrating the steps of removing from the queue of FIG. 2 containing data nodes, in accordance with the present invention;

FIGS. 10A-10D are schematic diagrams illustrating the steps of removing from the queue of FIG. 2 which is empty or contains request nodes, in accordance with the present invention;

BEST MODES FOR CARRYING OUT THE INVENTION

Abstract Behavior of the Queue

As will be discussed in further detail below, the data structure or "queue" of the present invention is specifically applicable to software running on shared memory multiprocessor systems, especially in core applications such as operating systems, routers, etc. The queue has two distinct operations defined on it, namely "add" and "remove". The effect of the operations depends on the "state" of the queue, which can be one of three basic conditions: EMPTY, DATA, or REQUESTS.

Figure 1:
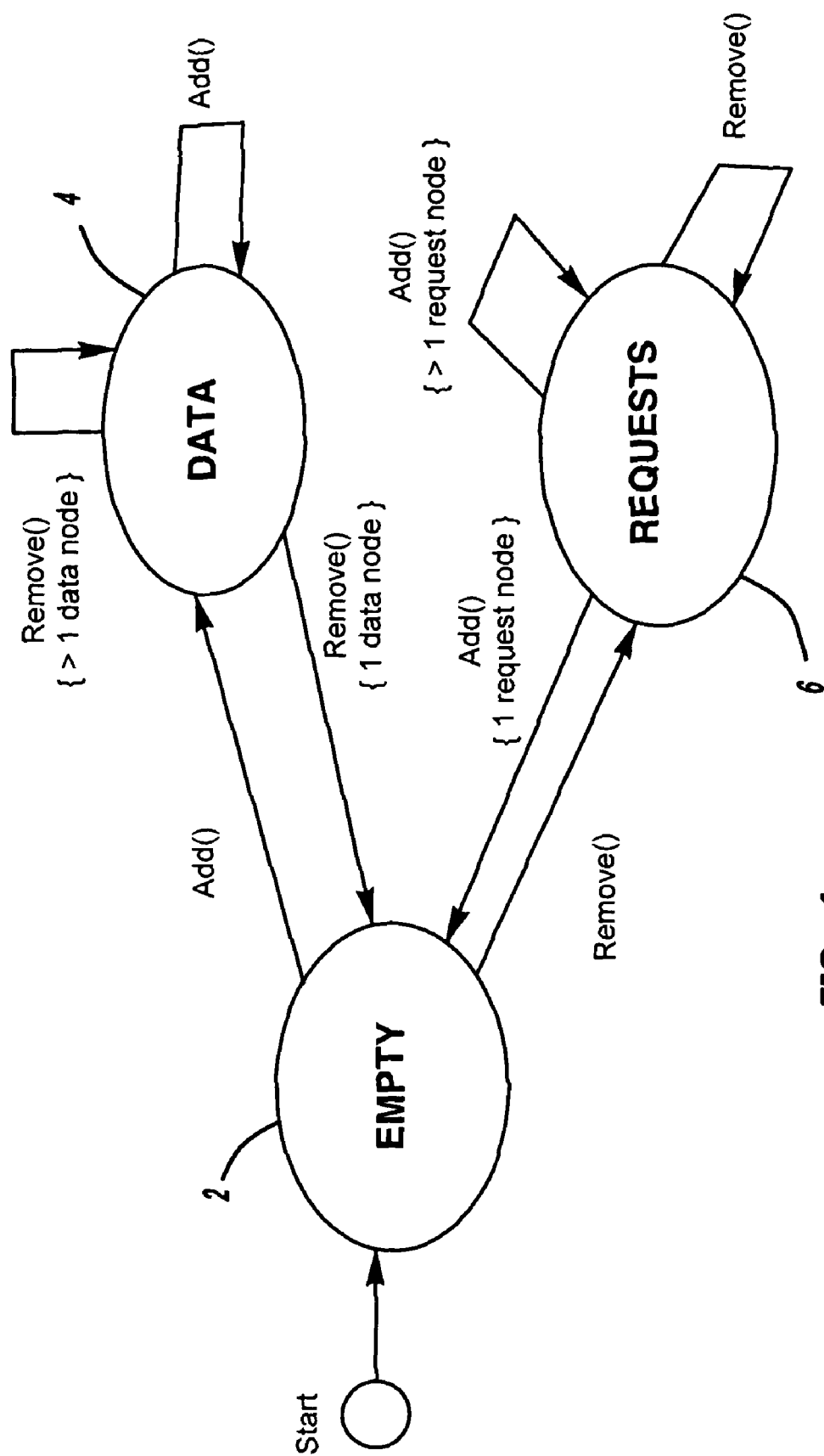
FIG. 1 is a finite state machine description of the lock-free dual queue of the present invention.

With reference to FIG. 1, "state" is used herein in the sense of a finite state machine. The queue of the present invention starts out EMPTY 2. It transitions from EMPTY 2 to DATA 4 if an add operation is performed, or it transitions to REQUESTS 6 if a remove operation is performed. Similar transitions are defined depending on the current queue state, the number of nodes, and the operation being performed.

The EMPTY state 2 is what its name implies—there are no data or request entries in the queue. The DATA state 4 means the queue has one or more entries each containing a data element added by an add operation. Finally, the REQUESTS state 6 means the queue has one or more entries representing a thread waiting for a data element to be added.

When an add operation is performed on an EMPTY queue 2, a data element is added and the state of the queue transitions to the DATA state 4. An add operation performed on a queue in the DATA state 2 keeps the queue in that state and adds another data element to the end of the queue. When an add operation is performed on a queue in the REQUESTS state 6, a data element is added to the request at the head of the queue and removes the request from the queue. At the same time, the thread waiting on the request awakens and returns from the remove operation that created the request, which returns the data element. In the event there is only one request in the queue, the queue transitions to the EMPTY state 2. Otherwise, it remains in the REQUESTS state 6 in order to fulfill the remaining requests.

When a remove operation is performed on an EMPTY queue 2, a request is added to the queue and the thread performing the remove waits for the request to be fulfilled by an add operation by some other thread. The queue then transitions into the REQUESTS state 6. A remove operation performed on a queue in the REQUESTS state 6 remains in that state. It creates a request, adds it to the end of the queue, then has the thread wait. A remove operation performed on a queue in the DATA state 4 removes the data entry at the head of the queue and returns the data value. In the event there is only one data entry in the queue, the queue transitions into the EMPTY state 2. Otherwise, it remains in the DATA state 4.

When a remove operation is invoked, it can be provided with a time out value. If such a value is provided and the remove operation creates a request, the request will thus "time out" if not fulfilled before the selected time out interval elapses. If the request times out, the thread that invoked the remove operation will awaken and be notified that the operation is returning due to a time out. The request is then removed from the queue. If that was the only request in the queue, the queue state will transition to the EMPTY state 2.

Implementation of the Queue

Data Structures

The queue is represented by a linked list of nodes pointed to by a head pointer and a tail pointer. By way of overview, it is understood in computer science that a "pointer" is a programming language datatype whose value is the memory address of another value and is used to refer to ("points to") that other value. Pointers are fundamental in constructing many data structures and in exchanging information between different parts of a program.

Similarly, a "linked list" is understood as one of the fundamental data structures in computer programming. A linked list comprises a sequence of nodes, each containing arbitrary data fields and one or more pointers ("links") to the next and/or previous nodes. A node in a linked list is said to be a self-referential datatype because it contains a pointer or link to another object of the same type. There are many variants of linked lists including, by way of example, but not limitation, singly-linked, doubly-linked, and circularly-linked.

The simplest variant is, of course, the singly-linked list which has one link, or pointer, per node, which contains the address of the next node in the list or, if the node is the last one in the list, is null. In contrast, a doubly-linked list (two-way linked list) has two links per node. One link either points to the previous node or is null if it is the first node, and one link either points to the next node or is null if it is the final node. Finally, in a circularly linked list, the first and final nodes are linked together.

As disclosed herein, linked lists may also contain a special sentinel or "dummy" node at the beginning or end of a list which is not used to store data. Rather, its purpose is to speed up or simplify certain operations by ensuring that every data node always has a previous and/or next node, and that every list (even one that contains no data elements), always has a "first" and a "last" node.

Figure 2:
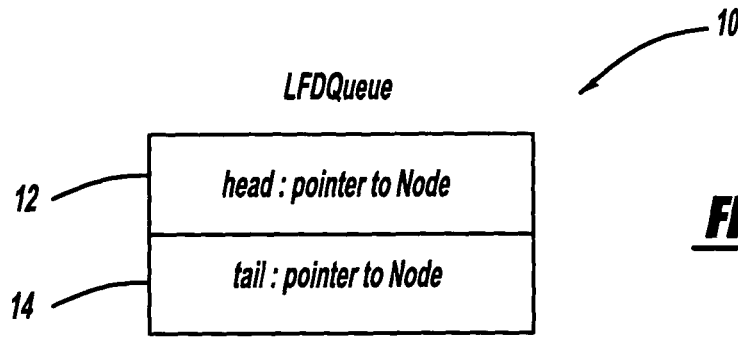
FIG. 2 is a schematic diagram of a general queue in accordance with the present invention.

With reference to FIG. 2 of the drawings, the queue of the present invention is shown diagrammatically and referred to generally by reference numeral 10. Queue 10 includes a head pointer 12 and a tail pointer 14. Head pointer 12 will point to the first node in a linked list, tail pointer 14 will point to the last node in the linked list, and each node, starting with the first node, will point to the next node in the list, until the last node is reached, which is distinguished in that it doesn't point to another node. The queue is empty if the head and tail pointers 12 and 14 both refer to the same node.

To avoid the above referenced ABA problem, the head and tail pointers include update counters (an integer field that is incremented each time the pointers are updated). Alternatively, hazard pointers may be utilized instead. The use of update counters is possible as long as the address and counter can be updated by a single CAS instruction (e.g. using 32-bit addresses on 64-bit processor architectures).

Figure 3:
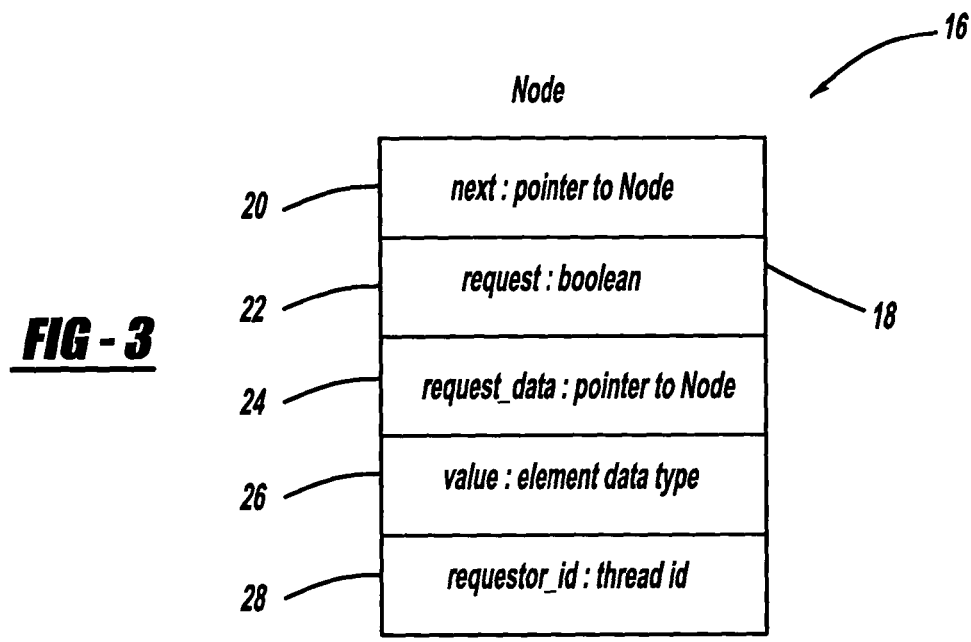
FIG. 3 is a schematic diagram of a general node of the queue of FIG. 2.

As shown in FIG. 3, each of the linked nodes (referred to generally by reference numeral 16) comprises a plurality of logical "fields" 18 including, for example, the following: (1) "next" 20—a pointer to the next node in the list; (2) "request" 22—a Boolean value set to TRUE if the node represents a request; (3) "request_value" 24—a pointer to the data node fulfilling a request; (4) "value" 26—the data value added to the queue; and (5) "requestor_id" 28—which identifies the thread that made the request. Nodes play different roles and the same node can move from one role to another. Moreover, only a subset of the fields of a node is used in any given role.

A node 16 can represent at least three basic entities in the queue depending on and corresponding to the role it is playing. For example, it can be a "dummy" node as discussed above and shown in FIG. 4 designated generally by reference numeral 30, a "data" node as shown in FIG. 5 and designated generally by reference numeral 32, or a "request" node as shown in FIG. 6 and designated generally by reference numeral 34.

Figure 4:
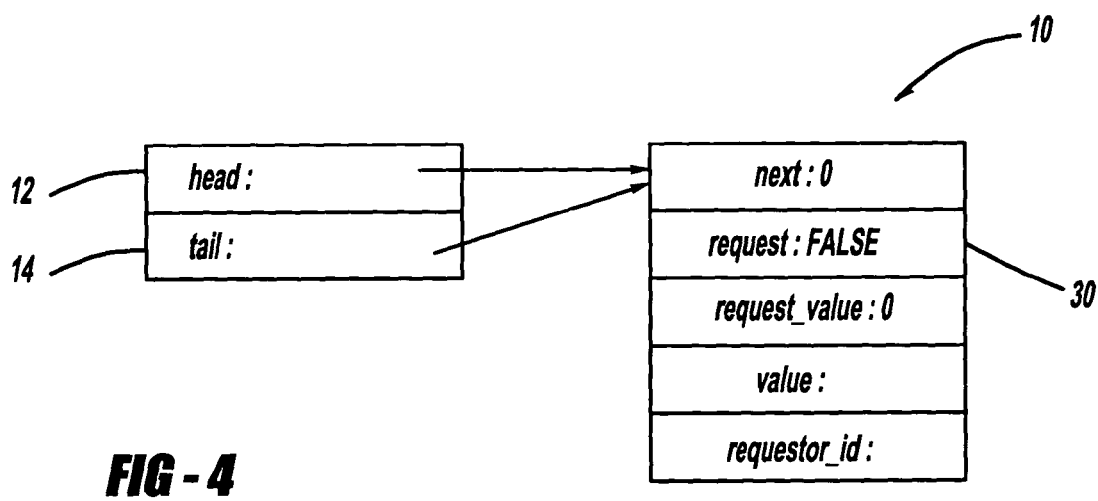
FIG. 4 is a schematic diagram of the queue of FIG. 2 with no data or request entries (i.e. the queue is EMPTY)

In a preferred embodiment, there is one and only one dummy node in the queue. Thus, if the queue state is EMPTY, as shown in FIG. 4, the dummy node 30 is the only node in the queue 10. If the queue state is DATA, as shown in FIG. 5, the dummy node 30 is the first node in queue 10, i.e. the node pointed to by the head pointer 12 as indicated above. If the queue state is REQUESTS, as shown in FIG. 6, the dummy node 30 is the last node in queue 10 and is pointed to by the tail pointer 14.

A data node 32, as shown in FIG. 5, contains the data value passed in via an add operation. The value is represented by the "value" field 26. If data node 32 is the last node in the queue, the "next" field 20 is set to zero ("null") and the "request" field 22 is FALSE. If the add operation is performed on a queue in either the DATA or EMPTY states, the data node will be added to the end of the linked list 36. In either event, the "next" field 20 of the previous node 16 will be set to the address of the newly added data node 32. If the add operation is performed on a queue in the REQUESTS state as shown in FIG. 6, the "request_value" field 24 of the request node at the head of the queue 10 will be set to the address of the newly added data node 32.

A request node 34, as shown in greater detail in FIG. 6, represents the request of a thread that executed a remove operation on a queue 10 that did not contain any data nodes, i.e. the queue was in either the EMPTY or REQUESTS state. A request node 34 is created by the remove operation by modifying the dummy node 30 at the end of the linked list by setting: (1) the "requestor_id" field 28 to identify the requesting thread, (2) the "request" field 22 to TRUE, and, lastly (3) the "next" field 20 to the address of a newly created dummy node.

In keeping with the invention, there is provided a protocol between threads creating requests as part of a remove operation and threads fulfilling requests as part of an add operation. The request thread must let the fulfilling thread know to signal it by setting the "requestor_id" field 28 with a value that identifies the request thread. The fulfilling thread sets the "request_value" field 24 of request node 34 with the address of the data node 32 with the value, and then signals the requesting thread that the "request_value" field 24 of the request node 34 has been set. Significantly, the setting of the request_value field with the data node address is done by a condition synchronization primitive. In a preferred embodiment, the condition synchronization primitive is a CAS instruction with the expected value being zero. The result of the CAS instruction tells the fulfilling thread whether the request is being fulfilled or being timed out. More specifically, the fulfilling thread notices the request by the request node 34 being denoted as a request (i.e. the request field is set to TRUE) and further, the request node 34 is at the head of the queue. It is important that the requesting thread set the requestor_id field so that the fulfilling thread knows which mutex and condition variable to use to signal the requesting thread. More simply, the fulfilling thread must be able to determine which thread to notify that its request has been fulfilled. As indicated above, the setting of the next field makes the request node 34 visible to the fulfilling thread. Accordingly, the next field must be set after the request and requestor_id fields are set.

The requesting thread wakes up and retrieves the value from the data node 32 pointed to by the request node's "request_value" field 24. The fulfilling thread removes the request node 34 from the head of the linked list 36.

If the requesting thread "times out" while waiting, i.e. the wait-for-signal call returns with an indication that the specified timeout interval has elapsed, the requesting thread sets the "request_value" field 24 to a non-zero value via a CAS instruction. If the CAS succeeds, it is understood that the timeout occurred and the remove operation returns that the remove operation timed out. Alternatively, if the CAS fails, it is understood that a fulfilling thread executing an add operation was able to set the "request_value" field 24 with a data node 32 successfully via a CAS instruction. In such case, the requesting thread proceeds as when the request is successfully fulfilled.

A fulfilling thread, i.e., one executing an add operation on a request at the head of the list, removes the request node 34 from the head of the list. It then performs a CAS operation on the request node's "request_value" field 24 in an attempt to set it to the address of the data node 32. If the CAS succeeds, the thread signals the requesting thread, which it can identify by the contents of the "requestor_id" field. If the CAS fails, it is understood that the requesting thread timed out (i.e. the requestor was able to set the "requestor_id" field 28 to a non-zero value via a CAS instruction), so the fulfilling thread deletes the request node and starts the add operation over.

Significantly, both the fulfilling thread and the requesting thread attempt to modify the request_value field 24 of the request node 34 via a condition synchronization primitive such as a CAS instruction. This is important to synchronization since it ensures that both threads agree whether there is a fulfillment or time out. Only one CAS instruction can succeed in modifying the field from zero. The request node 34 must appear at the head of the queue before a fulfilling thread can act on it. The protocol ensures that the fulfilling thread can properly provide a value for the requesting thread regardless of the interleaving of execution of the steps carried out by the add and remove operations. The protocol further ensures that the fulfilling and requesting threads will both agree whether a request is timed out, regardless of the interleaving.

The Add Operation

The add operation takes a single parameter—the data value—to add to the queue 10. The first function the add operation performs is to create a new data node 32 by setting the "next" field 20 to zero, the "request" field 22 to FALSE, and the "value" field 26 to the value of the parameter passed in. The shared head and tail pointer values are then read into thread local memory. The next function performed by the add operation is dependent on the state of the queue 10 as described below.

Adding to an Empty Queue or One Already Containing Data Nodes

As shown in FIGS. 7A-7C, to be in the EMPTY state or DATA state, the head pointer 12 is equal to the tail pointer 14, or the node 16 pointed to by the head pointer 12 has a "request" field 22 value of FALSE and a non-zero "next" field 20 value (i.e., it points to another node).

The add operation then attempts to modify the shared tail pointer 14 by performing a CAS instruction that attempts to change it from the value it was when read earlier to the address of the new data node 32. If the CAS instruction succeeds, no other thread can access what was the last node 16. The "next" field 20 of the last node 16 is assigned the address of the new data node 32, thus completing the update of the queue 10.

If the CAS instruction fails, it is understood that some other thread has updated the shared tail pointer 14 since the time this thread read it. Accordingly, the operation loops back and starts over by re-reading the shared head and tail pointers 12 and 14.

Adding to a Queue Containing Request Nodes

As shown in FIGS. 8A-8D, to be in the REQUEST state, the head pointer 12 must point to a node 16 that has its "request" field 22 set to TRUE and a non-zero "next" field 20.

The operation attempts to remove the first node in the linked list (request node 34) by performing a CAS instruction on the shared head pointer 12, thus attempting to change its value from the address of the request node 34 to that of the second node 16, effectively removing the first node 16 from the head of the linked list 36. If the CAS instruction succeeds, the thread executing the add operation has exclusive access to the request node 34 just removed. If the CAS instruction fails, it is understood that some other thread has already removed the request node 34. Accordingly, the operation then loops back and starts over by rereading the shared head and tail pointers 12 and 14.

If the CAS instruction succeeds, the operation then reads the "requestor_id" field 28 from the request node 34 to identify the thread waiting for data. Then it performs a CAS instruction on the "request_value" field 24 of the request node 34, expecting the value to be zero and replacing it with the address of the data node 32 created at the beginning of the operation. If this CAS instruction fails, (i.e., the value of the "request_value" field 24 was non-zero), it is understood that the requesting thread timed out and is no longer waiting. In such case, the operation deletes the node 34 and once again loops back and starts over by rereading the shared head and tail pointer 12 and 14.

If the CAS instruction of the "request_value" field 24 succeeds, the operation then uses the "requestor_id" field 28 value of request node 34 to obtain the mutex and condition variable unique to the requestor thread, locks the mutex, signals the condition variable, and then unlocks the mutex. At this point, the operation has successfully provided a data value for a thread waiting on a remove. The waiting thread will have awakened to get the data value from the data node 32 in the "request_value" field 24 and returned the value.

In keeping with the invention, any suitable definitions may be utilized for the mutex and condition variable. However, in a preferred embodiment, they may be as defined by the POSIX threads standard (IEEE 1003.1c) or be lower level entities specific to the operating system so as to provide better performance. One preferred implementation would have an array of mutex and condition variable objects initialized and have the "requestor_id" field 28 value be an integer that uniquely identifies threads and can be used as an index into the array.

The Remove Operation

The remove operation takes an output parameter, a reference to an object that holds an instance of the data value being held in the queue 10, and an optional input parameter that specifies how long to wait for a data value to be added if the remove results in a request. The return value is a Boolean value that indicates whether a data value was returned in the output parameter. It is TRUE unless the operation times out. What the remove operation does first is read the shared head and tail pointer values 12 and 14 into thread local memory. What occurs next, depends on the state of the queue 10.

Removing from a Queue Containing Data Nodes

Referring now to FIGS. 9A-9B, if the head and tail pointers 13 and 14 are not equal, the first node's "request" field 20 is FALSE and the "next" field 22 is non-zero, then the queue 10 contains data nodes 32. Since the first node is a dummy node 30 when the queue 10 contains data nodes 32, the value is read from the second node's "value" field. Then the operation attempts to perform a CAS instruction on the shared head pointer 12 to modify it from what was read earlier to the address of the second node 16. If the CAS instruction fails, it is understood that some other thread has already read the second node's value and removed the first node. Accordingly, the operation loops back and starts over with rereading the shared head and tail pointers 12 and 14.

If, however, the CAS instruction succeeds, the result is that the operation has removed the first node, which was a dummy node 30. It deletes the node, assigns the value to the output parameter, and returns TRUE. The data node 32 from which the value was read is now the first node and has become the dummy node.

Removing from an Empty Queue or a Queue Containing Request Nodes

Turning now to FIGS. 10A-10D, if the head and tail pointers 12 and 14 are equal or the first node's request field is TRUE, then the queue is empty or contains request nodes 34. In such case, the remove operation creates a new node 16, with "next" and "request_value" fields 20 and 22, respectively, set to zero, and the "request" field 24 set to FALSE. It then attempts to perform a CAS instruction on the shared tail pointer 14 to change it from the address of the last node to the address of the new node 16. If the CAS instruction fails, it means that some other thread was able to add a node to the end of the list between the time the shared tail value was read and the CAS instruction was attempted. The operation then loops back and starts over by rereading the new values of the shared head and tail pointers 14 and 16.

If the CAS instruction of the tail pointer 14 succeeds, the new node 16 becomes the new dummy node 30. The former last node of the linked list 36, which was the dummy node, becomes a request node 34, i.e. the operation sets the "requestor_id" field 28 to the value identifying the thread executing the operation, and the "request" field 22 is set to TRUE, then the "next" field 20 is assigned the address of the new dummy node 30, thus completing the addition of the request to the queue 10.

The operation reads the "request_value" field 24 of the request node 34. If it is zero, it hasn't yet been set to a data node address by a fulfilling thread. The thread's specific mutex is locked and the "request_value" field 24 is checked again. If the value is still zero, the operation executes the wait operation on the thread's condition variable thus causing it to wait for a signal from a fulfilling thread. If a time out value was provided, then the operation executes a timed wait on the condition variable.

When the wait operation returns, if it was due to a time out, the operation will attempt to perform a CAS instruction on the "request_value" field 24. In such case, the expected zero will be replaced with a one. If the CAS instruction succeeds, it is understood that no thread fulfilled the request. Accordingly, with the request marked as being time out, the operation returns FALSE. If the CAS instruction on the "request_value" field 24 fails, it is understood that another thread was able to successfully perform an add operation that fulfilled the request. In such case, the operation carries on as if it was signaled by the fulfilling thread.

If the wait operation returns because of the condition variable being signaled by a thread that has fulfilled the request by performing an add operation, the requesting thread goes on to assign the output variable the contents of the "value" field contained in the data node addressed by the "request_value" field. The data node and the request node are then both returned to the memory allocator and the operation returns TRUE.

Significantly, it is important for the remove operation to lock the requesting thread's mutex while checking the request node's "request_value" field 0 and waiting on the condition variable. It is similarly important for the fulfilling thread to lock the requesting thread's mutex while signaling the condition variable. A simple thread pause and resume is inadequate in view of possible ordering of events, such as the following: the requesting thread checks the "request_value" field and finds it to be zero; a fulfilling thread then sets the "request_value" field to the address of the data node and signals the requesting thread to resume; and the requesting thread then performs a pause. In the above described event order, the requesting thread was not paused when the resume was sent so when it does execute the pause, it has no chance of ever being resumed. To avoid this problem, the check of the "request_value" field and execution of a "wait" operation must be within a critical section in the requesting thread. Since the mutex and condition variable are unique to the requesting thread, the only potential contention is between the requesting thread and the thread attempting to fulfill the request as part of an add operation.

It is important to use a lock-free memory allocator to allocate and deallocate nodes. Otherwise, whatever advantage might have been gained by having a lock-free queue may be lost in the contention for memory allocation. Although any suitable lock-free memory allocator may be used, including those disclosed in the reference Maged M. Michael, "Scalable Lock-Free Dynamic Memory Allocation", *The 2004 ACM SIGPLAN Conference on Programming Language Design and Implementation*, pp 35-46, June 2004, a simple freelist-based lock-free memory allocator is used in a preferred embodiment.

Figure 11A:
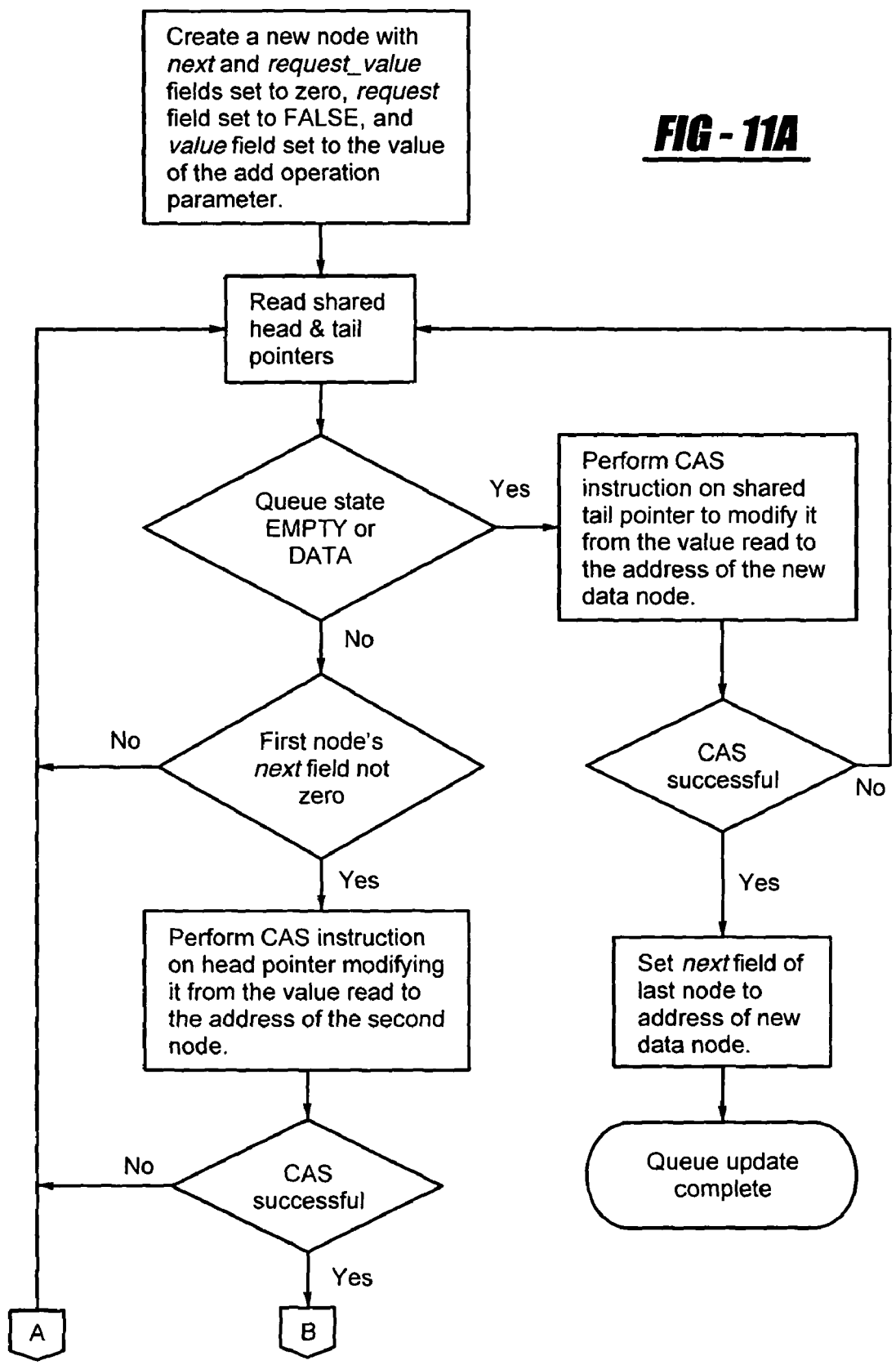
FIGS. 11A-11B are flow diagrams of the "add" operation steps in accordance with the present invention.
Figure 11B:
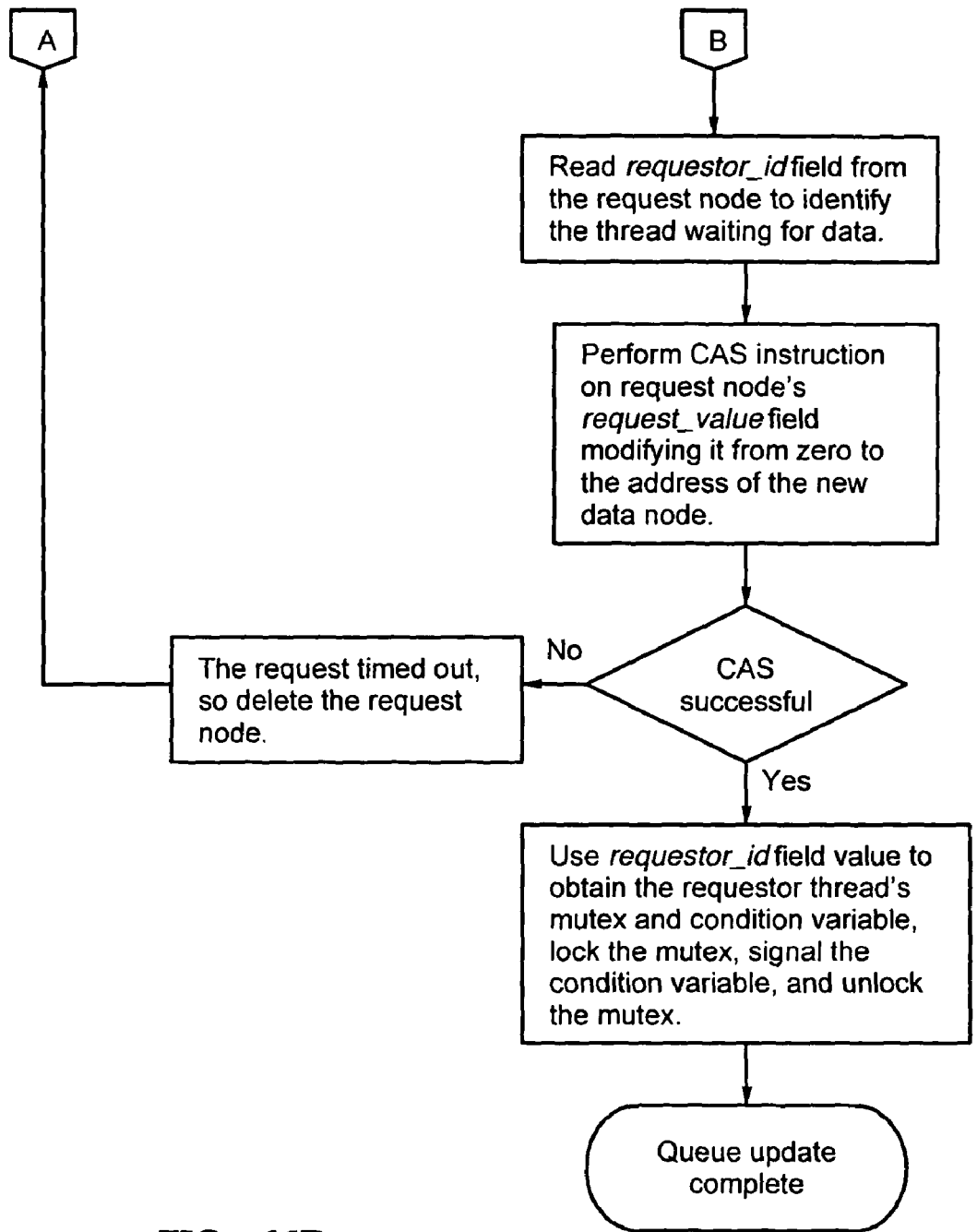
Figure 12A:
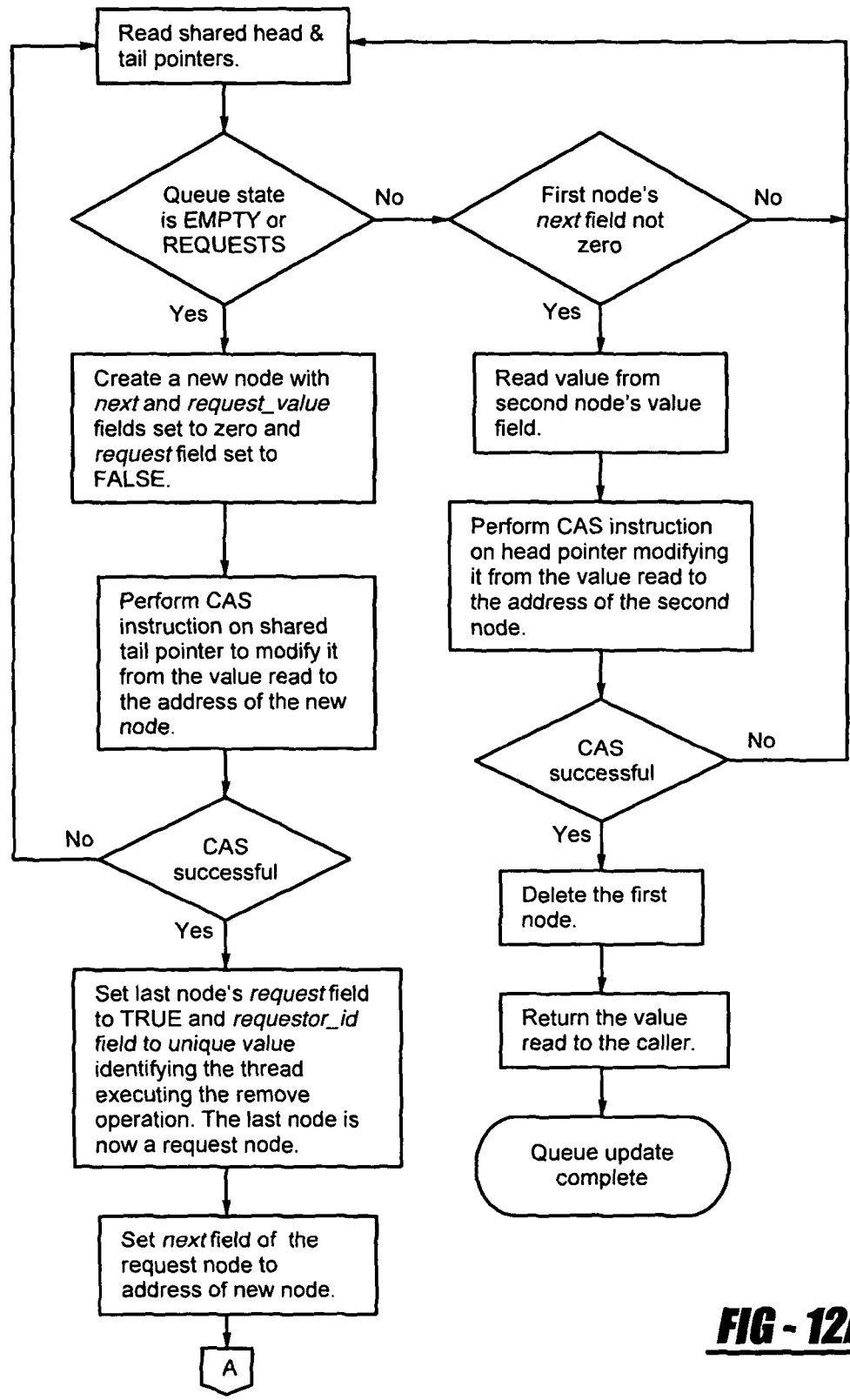
FIGS. 12A-12C are flow diagrams of the "remove" operation steps in accordance with the present invention.
Figure 12B:
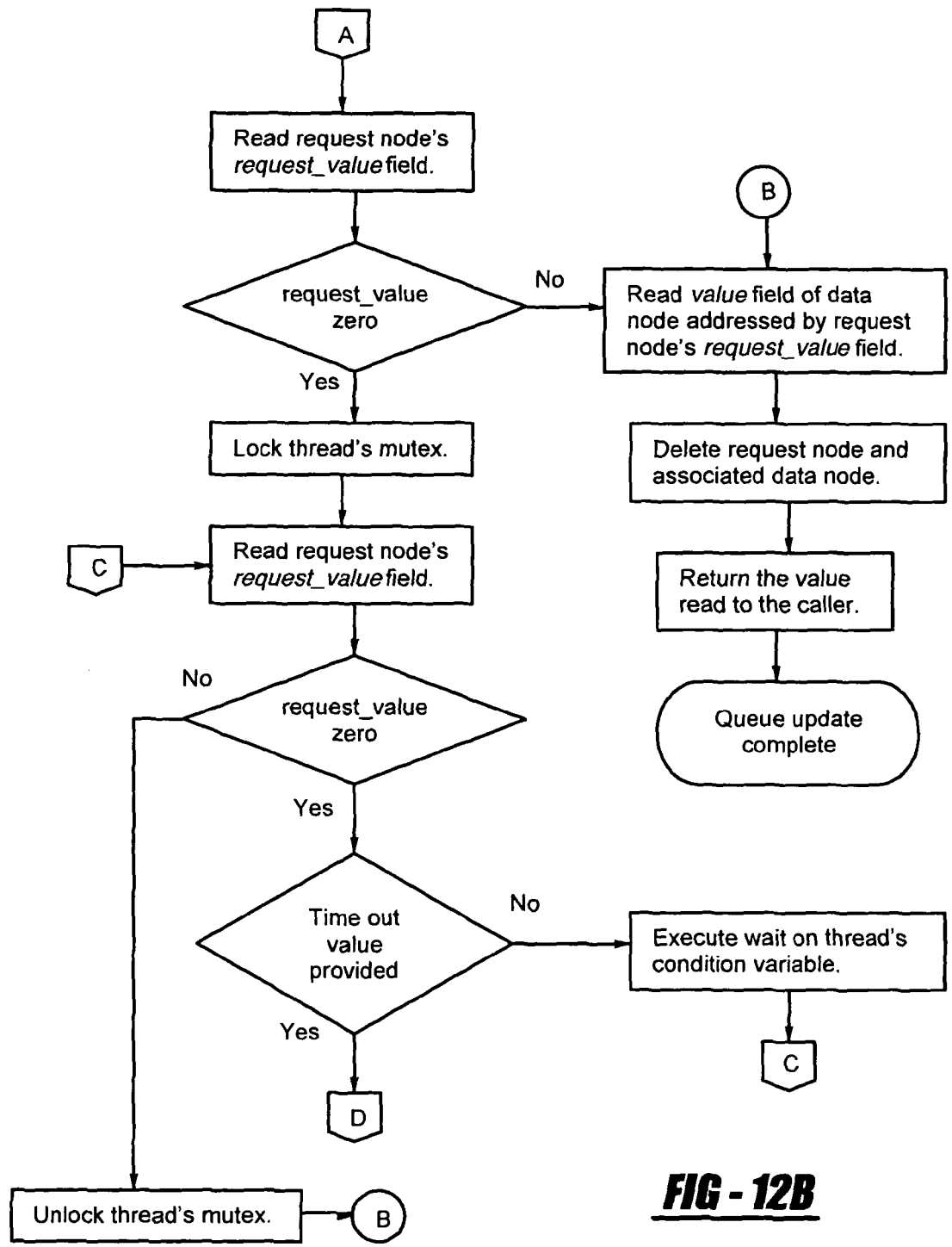
Figure 12C:
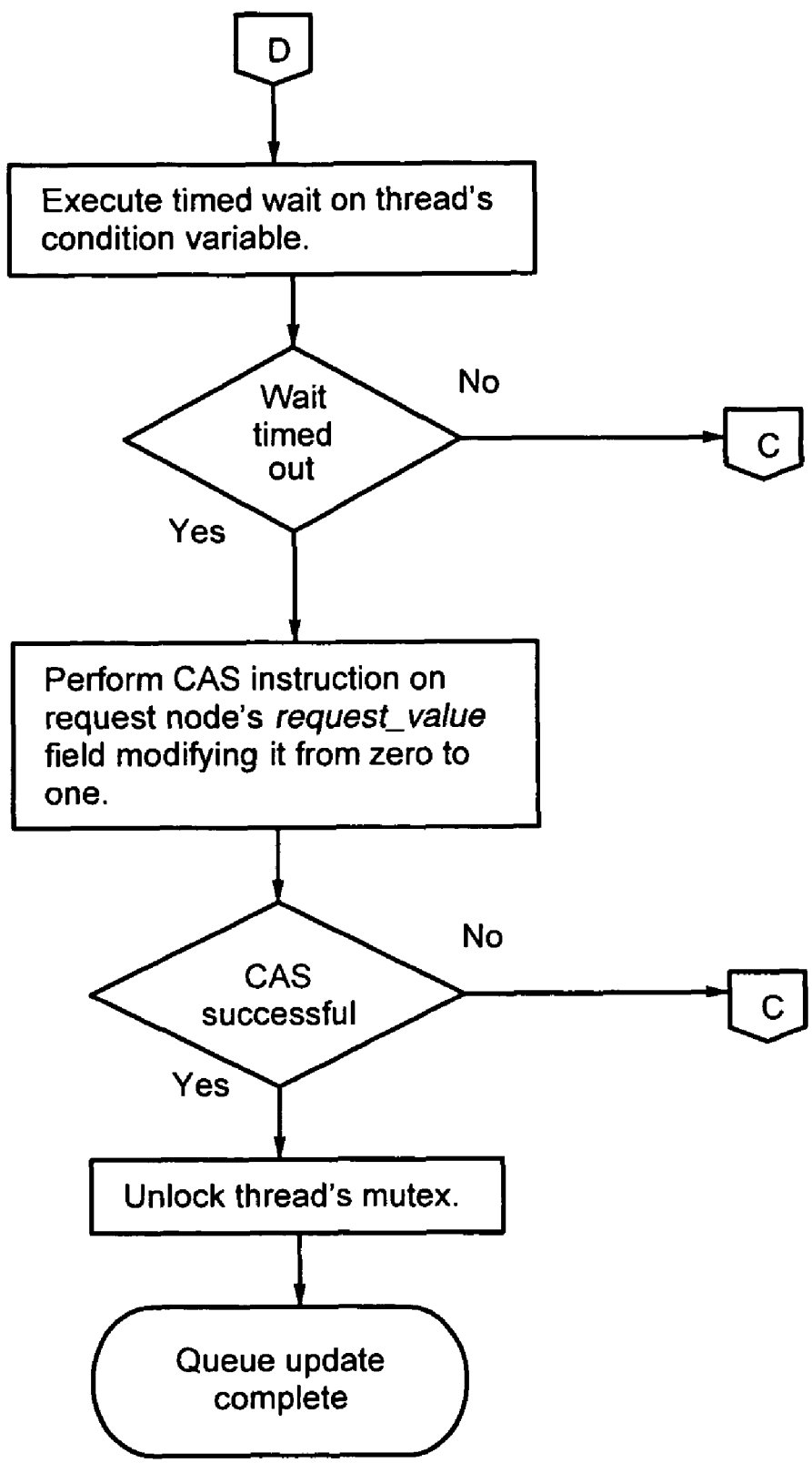

The above add and remove operations are further shown and described in the flow diagrams of FIGS. 11 and 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of supporting condition synchronization for a shared data structure so as to provide concurrent access, the method comprising:
   providing a linked list of nodes representing the data structure and having corresponding addresses, including a head pointer pointing to a first node in a list and a tail pointer pointing to a last node in the list, and all nodes therebetween pointing to their next successive node, respectively, the data structure having add and remove operations that are defined depending on a state of the data structure;
   setting, by a request thread, a requestor_id field of a dummy node in the list with a value that identifies the request thread, setting a request field to true, and setting a next field to an address associated with a new node in the list, so as to transform the dummy node to a request node and alert a fulfilling thread to signal the request thread;
   setting, by the fulfilling thread, a request_value field of the request node with an address of a data node using a Compare-and-Swap (CAS) instruction;
   signaling the request thread of the dummy node that the request_value field of the request node has been set, wherein the request thread is identified for signaling using the requestor_id field; and
   retrieving the value of the data node pointed to by the request_value field of the request node.

2. A method as in claim 1, further comprising:
   setting the request_value field of the request node to a non-zero value using a CAS instruction if a wait-for-signal call returns with an indication that a specified timeout interval has elapsed.

3. A method as in claim 1, wherein the state of the data structure comprises a first state when the data structure has no data, a second state when the data structure has one or more entries each containing a data element added by an add operation, and a third state when the data structure has one or more entries representing a thread waiting for a data element to be added.

4. A method as in claim 3, wherein:
   the dummy node is the only node in the data structure if the state is a first state;
   the dummy node is the first node in the data structure and is pointed to by the head pointer if the state is a second state; and
   the dummy node is the last node in the data structure and is pointed to by the tail pointer if the state is a third state.

5. A method as in claim 1, wherein the dummy node may be transformed to a request node when a thread performs a remove operation that results in the creation of a request due to the state of the data structure, and a second dummy node may be positioned as the last node in the list with both the tail pointer and a selected field of the transformed request node set to the corresponding address of the second dummy node.

6. A method as in claim 1, wherein signaling the request thread comprises:
   locking a mutex of the requesting thread.

7. A method as in claim 1, further comprising:
   if the request thread is not signaled within a specified amount of time, removing the request node from the list.

8. A system comprising:
   a processor;
   a memory connected to the processor;
   a data structure stored in the memory, the data structure comprising:
   a linked list of nodes comprising a head pointer pointing to the first node and a tail pointer pointing to the last node, each node therebetween pointing to a respective successive node;
   an add operation invocable by a fulfilling thread;
   a remove operation invocable by a requesting thread; and
   in response to invocation of add and remove operations by the fulfilling and requesting threads, respectively, a protocol configured to cause:
   the requesting thread to set a requestor_id field of a data node in the linked list with a value that identifies the requesting thread;
   the fulfilling thread to:
     set a request_value field of a request node in the linked list via a Compare-and-Swap (CAS) operation with the address of the data node;
     by using the requestor_id field to identify the requesting thread, signal the requesting thread that the request_value field of the request node has been set; and
   in response to receiving the signal, the requesting thread to wake up and retrieve the value from the data node pointed to by the request_value field of the request node.

9. A system as in claim 8, the protocol further configured to cause:
   if a wait-for-signal call returns with an indication that a specified timeout interval has elapsed, the requesting thread to set the request_value field of the request node to a non-zero value via a CAS operation.

10. A system as in claim 9, wherein the remove operation is configured to return an indication that the operation timed out when the CAS operation is successful, and
    wherein the CAS operation is configured to fail when the fulfilling thread had previously set the request_value field of the request node with the address of the data node.

11. A system as in claim 8, wherein the add and remove operations are defined depending on a state of the data structure.

12. A system as in claim 11, wherein the state of the data structure comprises at least one of:
    a first state when the data structure has no data;
    a second state when the data structure has one or more entries each comprising a data element added by an add operation performed thereon; and
    a third state when the data structure has one or more entries representing a thread waiting for a data element to be added.

13. A system as in claim 12, configured to:
    in response to an add operation performed thereon in the first state, add a first data element and change to the second state;
    in response to an add operation performed thereon in the second state, add a second data element to the end of the data structure;
    add a third data element to a request at the head of the data structure;
    in response to a thread waking up and returning the third data element, remove the request; and
    in response to an add operation performed thereon in the third state, change to the first state if only one request is pending.

14. A system structure as in claim 12, configured to:
add a request and place the thread in a wait condition until the request is fulfilled by another thread performing an add operation;
in response to a remove operation performed thereon in the first state, change to the third state;
add a second request to the end of the data structure and, in response to a remove operation performed thereon in the third state, place the thread in a wait condition; and
remove an entry at the head of the data structure and, in response to a remove operation performed thereon in the second state, change to the first state.

15. A system as in claim 14, configured to:
provide a time out value when a remove operation is invoked.

16. A system as in claim 8, wherein the protocol is operable to cause:
the fulfilling thread to signal the requesting thread by locking a mutex of the requesting thread.

17. A system as in claim 8, wherein the requesting thread is associated with a time out interval, the protocol operable to cause:
in response to a determination that the time out interval has lapsed, the fulfilling thread to remove the request node.

* * * * *